(12) United States Patent
Pirskanen

(10) Patent No.: US 7,796,991 B2
(45) Date of Patent: Sep. 14, 2010

(54) RRC SIGNALLING FOR FAST HS-DSCH SERVING CELL CHANGE

(76) Inventor: Juho Pirskanen, Ahkionkatu 16 A 2, 33580 Tampere (FI)

( * ) Notice: Subject to any disclaimer, the term of this patent is extended or adjusted under 35 U.S.C. 154(b) by 1088 days.

(21) Appl. No.: 11/424,270

(22) Filed: Jun. 15, 2006

(65) Prior Publication Data

US 2006/0293055 A1  Dec. 28, 2006

Related U.S. Application Data

(60) Provisional application No. 60/691,036, filed on Jun. 15, 2005.

(51) Int. Cl.
*H04Q 7/20* (2006.01)
(52) U.S. Cl. .................... 455/436; 455/437; 370/331
(58) Field of Classification Search ......... 455/436–439, 455/442, 445; 370/331–333
See application file for complete search history.

(56) References Cited

U.S. PATENT DOCUMENTS

| 7,308,262 | B2 * | 12/2007 | Tanoue ........................ 455/436 |
| 2004/0022213 | A1 * | 2/2004 | Choi et al. ................... 370/332 |
| 2004/0184424 | A1 * | 9/2004 | Shibata et al. ............... 370/331 |
| 2005/0141477 | A1 * | 6/2005 | Tomita et al. ................ 370/349 |
| 2006/0116118 | A1 * | 6/2006 | Charriere et al. ............ 455/423 |

FOREIGN PATENT DOCUMENTS

EP   1432262   6/2004

OTHER PUBLICATIONS

3GPP TSG-RAN WG2 meeting #46bis, Beijing, China, Apr. 4$^{th}$-8$^{th}$, R2-050965, Source: Qualcomm; Title: "HSDPA mobility enhancement," http://www.3gpp.org/ftp/tsg_ran/WG2_RL2/TSGR2_46bis/Documents/ see p. 3-p. 9; figure 2.
3GPP TSG-RAN1 meeting #40bis Tdoc R1-050324; Beijing, China, Apr. 4$^{th}$-8$^{th}$, Source: Lucent Technologies; Title: "Proposal for supporting Real Time services over HSDPA," http://www.3gpp.org/ftp/TSG_RAN/WG1_RL1/TSGR1_40bis/Docs/ see whole document.
3GPP TS 25.308 V6.3.0 (Dec. 2004), Technical Specification, 3$^{rd}$ Generation Partnership Project; Technical Specification Gropu Radio Access Network; High Speed Downlink Packet Access (HSDPA); Overall description; Stage 2 (Release 6), http://www.3gpp.org/ftp/Specs/html-info/25308.htm see p. 21-p. 26; figure 9, 3-1; 9, 5-1; 9, 4-1.
The International Search Report and Written Opinion for PCT/IB2006/001605 mailed on Nov. 24, 2006.

* cited by examiner

Primary Examiner—Cong Van Tran

(57) ABSTRACT

When a Universal Terrestrial Radio Access Network (UTRAN) receives an indication on Layer 3 (L3) (an L1/L2 indication is also possible) from the User Equipment (UE) that it is switching the High Speed—Data Shared Channel (HS-DSCH) reception to another cell in the active set (AS), the UTRAN sends a reconfiguration message to the UE via the target cell using a pre-configured configuration that UE has taken into use. The message can only include an indication that the pre-defined configuration can be used further by the UE or that a complete new configuration is to be used, e.g., using new HARQ info or even a hard handover (HHO) to another frequency. After receiving the configuration message, the UE responds with a normal reconfiguration complete message.

14 Claims, 2 Drawing Sheets

RRC SIGNALLING FOR FAST HS-DSCH SERVING CELL CHANGE

CROSS-REFERENCE TO RELATED APPLICATION

This application claims priority to U.S. Provisional Patent Application No. 60/691,036 filed on Jun. 15, 2005.

BACKGROUND OF THE INVENTION

1. Technical Field

The present invention relates to mobile communications and, more particularly, to signaling during a handover.

2. Discussion of Related Art

Although the invention arose in the context of the downlink packet data transmission in UMTS (Universal Mobile Telecommunications System) Terrestrial Radio Access, it is not limited thereto and the explanations that follow should be understood in a way that does not limit the invention to that context. High Speed Downlink Packet Access (HSDPA) is a feature included in Release'5 3GPP specifications and is further enhanced in Release 6 with the support of fractional Dedicated Physical Channel (DPCH), called F-DPCH, and the support of Signalling Radio Bearer mapping on the High Speed Downlink Shared Channel.

The invention addresses but is not limited to the Release 7 HSDPA improvement under discussions, which aims to speed up the handover and serving HS-DSCH cell change processes with HSDPA especially with real time applications, such as VoIP (Voice over Internet Protocol). One of the proposals has been presented in R1-050324 (Lucent) 3GPP TSG-RAN1 meeting # 40bis, 4-8 Apr. 2005, Beijing, China, 2005.

As expressed in R1-050324, the UTRAN pre-configures the BTS (Base Transceiver Station or "Node B" for a UE initiated cell change. After the UE has sent the layer 1, layer 2 or layer 3 indication e.g. RRC (Radio Resource control) layer measurement report indicating the cell change, the UE starts listening to the target cell. The UE can listen to both the source and target cells simultaneously (R1-050324).

The present invention addresses but is not limited to the L3 signaling scheme for the HS-DSCH serving cell change solutions where the UE changes the HS-DSCH reception to the other "pre-configured" cell after indicating the cell change in L1/2/3 signaling to the UTRAN. The prior art solution (R1-050324) does not solve the problem of how the UTRAN (RNC) is made aware (especially when Bi-casting is utilized by the UTRAN in the source and target cells) that the change is successful or give possibilities for UTRAN conform the cell change or further reconfigure the existing pre-configured configuration. In addition, the proposed scheme requires protocol interaction to keep RRC in correct state.

BRIEF SUMMARY OF THE INVENTION

Although an object of the present invention is to overcome the above-described problems, it is not limited to the specific problems described.

According to a first aspect of the present invention, a method for execution in a radio access network (RAN) comprises the steps of receiving a signal indication from a user equipment (UE) that it wants to switch reception of a high-speed data flow from a source cell to reception from another, target cell, and in response thereto, switching transmission of said data flow to the UE from said source cell to said target cell, sending to the UE a reconfiguration message via said target cell a message containing an indication that informs the UE to keep a pre-configured configuration or containing an indication of a new or partly new configuration, which the RAN prefers over the pre-configured configuration, and in response thereto, receiving from the UE a reconfiguration complete message.

In further accord with the first aspect of the invention, the indication of a new or partly new configuration, which the RAN prefers over the pre-configured configuration, contains possible new neighboring cells which UE may consider for subsequent switch of the reception of a high-speed data flow.

In still further accord with the first aspect of the invention, the method further comprises the step of waiting a predetermined period of time between said receiving said signal indication from said UE that it wants to switch reception of said high-speed data flow and said switching said transmission of said data flow from said source cell to said target cell.

Further according to the first aspect of the invention, the method further comprises the step of also sending the reconfiguration message via said source cell so that said reconfiguration message is bi-cast to said UE from both said source cell and said target cell.

Still further in accord with the first aspect of the present invention, a computer program stored in coded form on a computer readable medium is provided for facilitating and/or executing any one or more of the above mentioned steps in said RAN. Moreover, an integrated circuit may be provided for installation in said RAN for carrying out two or more of the steps according to the first aspect of the present invention.

According to a second aspect of the invention, a radio access network comprises a device or means for receiving a signal indication from a user equipment that it wants to switch reception of a high-speed data flow from a source cell to reception from another, target cell, a device or means responsive to said signal indication from said user equipment for switching transmission of said data flow to the user equipment from said source cell to said target cell, a device or means for sending to the user equipment a reconfiguration message via said target cell a message containing an indication that informs the user equipment to keep a pre-configured configuration or containing an indication of a new or partly new configuration, which the radio access network prefers over the pre-configured configuration, and for receiving, in response to said reconfiguration message, a reconfiguration complete message from the user equipment.

In further accord with the second aspect of the invention, the indication of a new or partly new configuration, which the radio access network prefers over the pre-configured configuration, comprises possible new neighboring cells which UE may consider for subsequent switch of the reception of a high-speed data flow.

In still further accord with the second aspect of the present invention, the radio access network further comprises a device or means for waiting a predetermined period of time between said receiving said signal indication from said user equipment that it wants to switch reception of said high-speed data flow and said switching said transmission of said data flow from said source cell to said target cell.

In yet further accord with the second aspect of the present invention, the device or means for sending the reconfiguration message to the user equipment is also for sending the reconfiguration message via the source cell so that the reconfiguration message is bi-cast to the UE from both the source cell and the target cell.

Still further in accord with the second aspect of the present invention, an integrated circuit is provided for installation in a network element of said radio access network wherein said integrated circuit embodies two or more of the elements of said radio access network according to the second aspect of the invention.

According to a third aspect of the invention, a method for execution in user equipment comprises the steps of sending a signal indication to a radio access network that the user equipment wants to switch reception of a high-speed data flow from a source cell to reception from another, target cell, receiving an acknowledgement message from the radio access network, switching reception of said data flow from said source cell to said target cell after a predetermined time period after receipt of said acknowledgement message, receiving a reconfiguration message from said radio access network containing an indication that informs the user equipment to keep a pre-configured configuration or containing an indication of a new or partly new configuration, which the radio access network prefers over the pre-configured configuration, and in response thereto, sending a reconfiguration complete message to the radio access network.

In further accord with the third aspect of the present invention, the indication that informs the user equipment to keep a pre-configured configuration or contains an indication of a new or partly new configuration, which the radio access network prefers over the pre-configured configuration comprises new neighboring cells which UE may consider for subsequent switch of the reception of a high-speed data flow.

According still further to the third aspect of the present invention, an integrated circuit is provided for carrying out two or more of the steps according to the third aspect of the invention in any combination and in any order.

Still further in accord with the third aspect of the present invention, a computer program stored in coded form on a computer readable medium is provided for executing the above mentioned steps in said user equipment.

According to a fourth aspect of the present invention, user equipment comprises a device or means for sending a signal indication to a radio access network that the user equipment wants to switch reception of a high-speed data flow from a source cell to reception from another, target cell, a device or means for receiving an acknowledgement message from the radio access network, a device or means for switching reception of said data flow from said source cell to said target cell after a predetermined time period after receipt of said acknowledgement message, and device or means for receiving a reconfiguration message from said radio access network containing an indication that informs the user equipment to keep a pre-configured configuration or containing an indication of a new or partly new configuration, which the radio access network prefers over the pre-configured configuration, and in response thereto, for sending a reconfiguration complete message to the radio access network.

In further accord with the present invention, the indication that informs the user equipment to keep a pre-configured configuration or contains an indication of a new or partly new configuration, which the radio access network prefers over the pre-configured configuration, comprises possible new neighboring cells which UE may consider for subsequent switch of the reception of a high-speed data flow.

In still further accord with the fourth aspect of the present invention, an integrated circuit is provided for installation in said user equipment according to the fourth aspect of the present invention, wherein said integrated circuit embodies two or more of the elements of the user equipment according to the fourth aspect of the present invention, in any combination.

According to a fifth aspect of the present invention, a method for execution in a system comprising a radio access network (RAN) able to communicate with user equipment (UE), comprises the steps of sending a signal indication from said UE to said RAN that the UE wants to switch reception of a high-speed data flow from a source cell to reception from another, target cell, receiving in said RAN said signal indication from said UE that it wants to switch reception of said high-speed data flow from said source cell to reception from said target cell, and in response thereto, said RAN sending an acknowledgement message to said UE, said UE receiving said acknowledgement message from the RAN, said RAN switching transmission of said data flow to the UE from said source cell to said target cell, said UE switching reception of said data flow from said source cell to said target cell after a predetermined time period after receipt of said acknowledgement message, said RAN sending to the UE a reconfiguration message via said target cell a message containing an indication that informs the UE to keep a pre-configured configuration or containing an indication of a new or partly new configuration, which the RAN prefers over the pre-configured configuration, and in response thereto, said UE receiving said reconfiguration message from said RAN containing said indication that informs the user equipment to keep said pre-configured configuration or containing an indication of said new or partly new configuration, which the RAN prefers over the pre-configured configuration, and in response thereto, said UE sending a reconfiguration complete message to the RAN.

In further accord with the fifth aspect of the present invention, the indication that informs the UE to keep a pre-configured configuration or containing an indication of a new or partly new configuration, which the RAN prefers over the pre-configured configuration, comprises possible new neighboring cells which UE may consider for subsequent switch of the reception of a high-speed data flow.

In still further accord with the fifth aspect of the present invention, the system method further comprises the step of said RAN waiting a predetermined period of time between said receiving said signal indication from said UE that it wants to switch reception of said high-speed data flow and said switching said transmission of said data flow from said source cell to said target cell.

According to a sixth aspect of the present invention, a system comprising a radio access network (RAN) able to communicate with user equipment (UE), further comprises a device for sending a signal indication from said UE to said RAN that the UE wants to switch reception of a high-speed data flow from a source cell to reception from another, target cell, a device for receiving in said RAN said signal indication from said UE that it wants to switch reception of said high-speed data flow from said source cell to reception from said target cell, and in response thereto, said RAN sending an acknowledgement message to said UE, said UE having a device for receiving said acknowledgement message from the RAN, said RAN having a device for switching transmission of said data flow to the UE from said source cell to said target cell, said UE having a device for switching reception of said data flow from said source cell to said target cell after a predetermined time period after receipt of said acknowledgement message, said RAN having a device for sending to the UE a reconfiguration message via said target cell a message containing an indication that informs the UE to keep a pre-configured configuration or containing an indication of a new or partly new configuration, which the RAN prefers over the pre-configured configuration, and possible new neighboring cells which UE shall consider for subsequent switch of the reception of a high-speed data flow, and in response thereto, said UE having a device for receiving said reconfiguration message from said RAN containing said indication that informs the user equipment to keep said pre-configured configuration or containing an indication of said new or partly new configuration, which the RAN prefers over the pre-configured configuration, and possible new neighboring cells which UE shall consider for subsequent switch of the reception of a high-speed data flow, and in response thereto, said UE having means for sending a reconfiguration complete message to the RAN.

In further accord with the sixth aspect of the present invention, the indication that informs the UE to keep a pre-configured configuration or containing an indication of a new or partly new configuration, which the RAN prefers over the pre-configured configuration, comprises possible new neighboring cells which UE may consider for subsequent switch of the reception of a high-speed data flow.

In still further accord with the sixth aspect of the present invention, said RAN further comprises a device for waiting a predetermined period of time between said receiving said signal indication from said UE that it wants to switch reception of said high-speed data flow and said switching said transmission of said data flow from said source cell to said target cell.

These and other objects, features and advantages of the present invention will become more apparent in light of the following detailed description of a best mode embodiment thereof, as illustrated in the accompanying drawing.

DETAILED DESCRIPTION OF THE INVENTION

Figure 1:
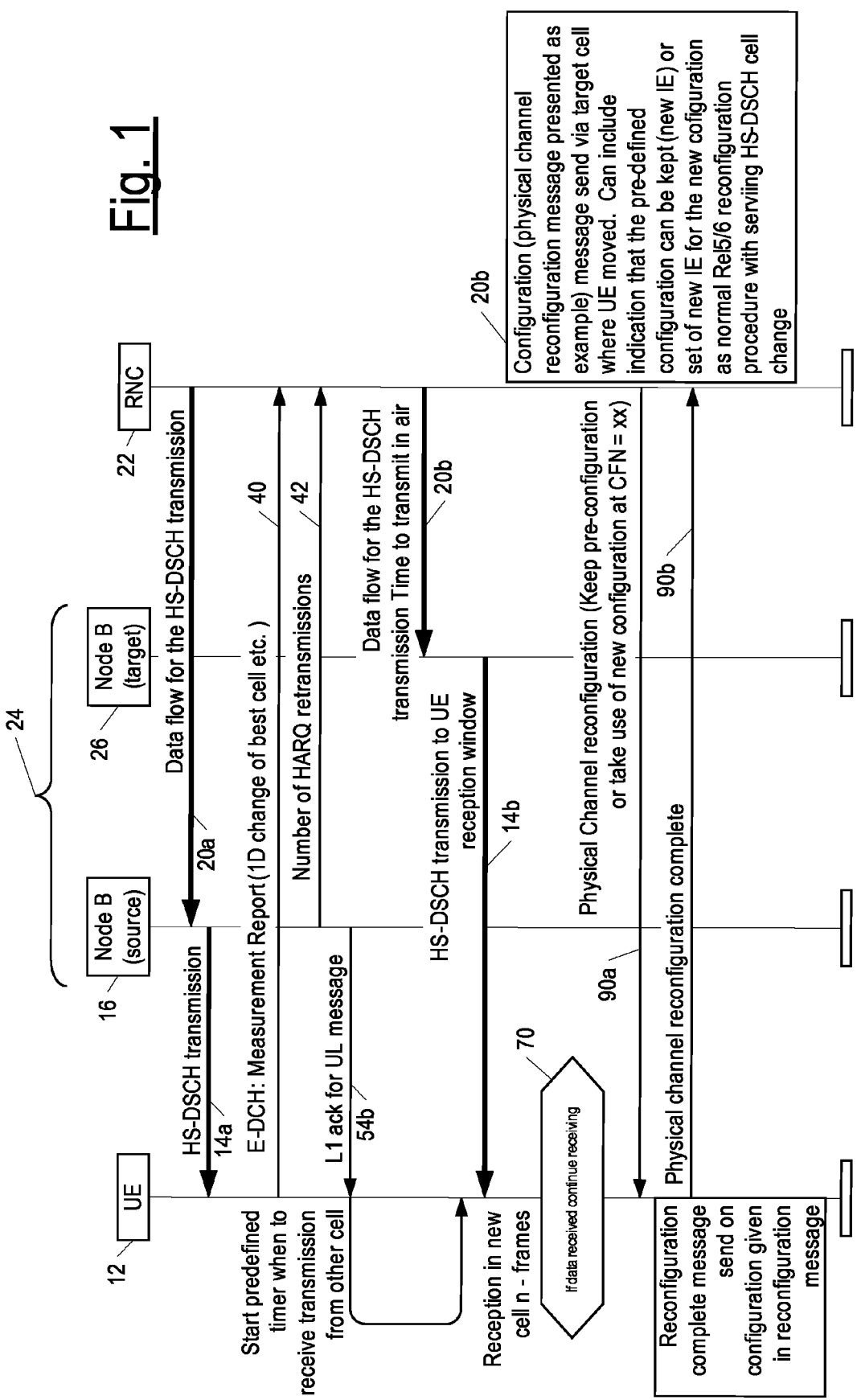
FIG. 1 shows signaling (light lines) and data (heavy lines), according to the present invention.

As shown in FIG. 1, a UE 12 is shown receiving an HS-DSCH data transmission on a wireless HSDPA downlink 14a from a source Node B 16 (sometimes called a base station) which in turn receives the data transmission on a hardwired line 20a from a radio network controller 22. The UE is making measurements of the strength of beacons from neighboring cells in case the source Node B's signal becomes weak and a stronger signal becomes available. The UE sends measurement reports, as shown on a line 40 via the Node B 16 to the RNC 22. The RNC 22 and the source Node B 16 form parts of a radio access network (RAN), called UTRAN in 3G. Although disclosed in the 3GPP (Third Generation Partnership Project) context at its current developmental stage, it should be realized that the invention is generally applicable to telecommunications and is not limited to the 3GPP or even to mobile communications.

Referring back to FIG. 1, the UE 12 is able to conduct measurements of the strength of the beacons from the various Node Bs 24. If it determines that the current source Node B 16 has a beacon signal that is weakening as compared to another Node B such as the Node B 26, it may decide, as indicated in a measurement report signal provided on a line 40 to the RNC 22, that the other Node B 26 should become its source for the data flow provided from the RNC. In that case, the other Node B 26 becomes a so-called target Node B until a changeover is made to its new role as the source Node B. As shown in FIG. 1, the current source Node B 16 may send a signal on a line 42 to the RNC 22 indicative of a number of HARQ (Hybrid Automatic Repeat reQuest) retransmissions.

Figure 2:
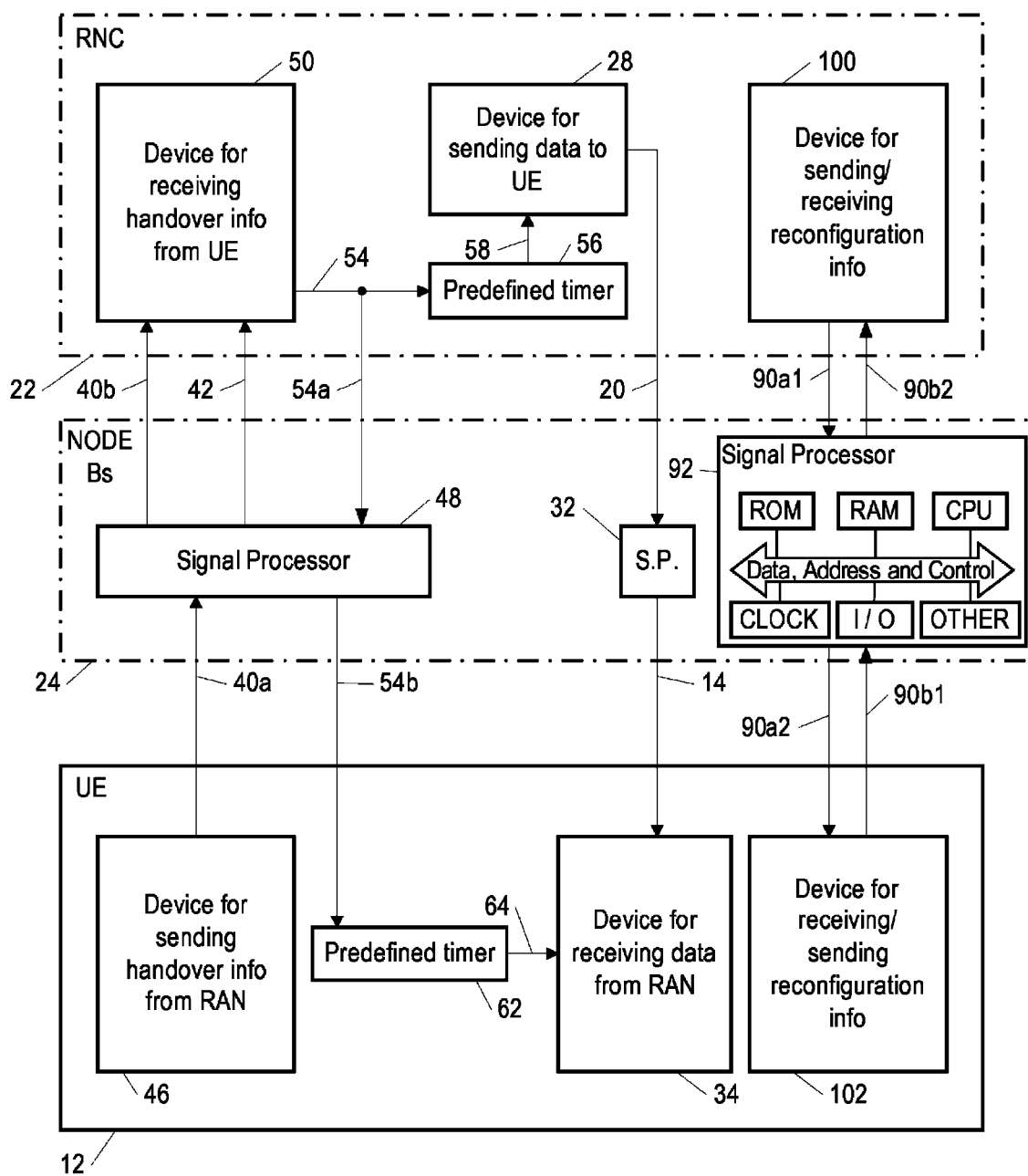
FIG. 2 shows a system, according to the present invention.

Referring to FIG. 2, the UE 12 is shown having a device 46 for sending handover information on the line 40a to the RNC 22 via the Node B 16. In FIG. 2, the source Node B 16 and the target Node B are lumped together in a single block labeled "Node Bs" (sometimes called "Nodes B" in the plural sense) with the reference numeral 24. The illustration of FIG. 2 shows the measurement report, which may be an E-DCH (Enhanced Dedicated Channel) measurement report, broken up into two parts, 40a, 40b. This is because the source Node B 16 includes a signal processor 48 which is responsive to the first part of the measurement report signal on a line 40a representing wireless signaling, which may be L1/2/3 signaling according to future developments. In any event, the signal processor 48 is responsive to the handover information provided on the uplink wireless line 40a, processes the information, and provides the handover information as a signal on a hardwired line 40b to a device 50 in the RNC 22 for receiving handover information from the UE/Node B. The device 50 may also include a signal processor for evaluating the measurement report. The UE may have the role of deciding a handover, or that decision may instead be made in the Node B or RNC; or it may be a joint decision, as the case may be. In any event, the device 50 provides a signal on a line 54 to a predefined timer 56 which, in response thereto, starts a timing of a predefined time duration. After the timer times out, it sends a timeout signal on a line 58 to the device 28 for sending data to the UE. The device 28 of the RNC 22 is responsive to the timeout signal and in response thereto sends the data flow on the line 20 to the target Node B 26 instead of the source Node B 16. In other words, it performs a handover function from sending to the Node B 16 to the Node B 26. This constitutes part of the handover of the data flow in the sense just described, where the target Node B 26 becomes the recipient of the data instead of the former source Node B 16. In such a case, the target Node B 26 then becomes and takes on the role of the source Node B for so long as its signal strength remains strong, depending on the geographic movements of the UE 12. It may also be the case that the signal on the line 54 from the device 50 to the timer 56 in the RNC may also be provided to the UE on a line 54a via the original source Node B 16. In that case, a similar timer 62 within the UE 12 is responsive to a signal on a line 54b and starts a timeout period similar to the period timed by the timer 56 in the RNC. Once the predefined timer 62 times out, a timeout signal is provided on a line 64 to the device 34 which indicates to the device 34 that the data flow is now to be received on the line 14b (as best seen in FIG. 1) from the target Node B 26 rather than the source Node B 16.

Referring back to FIG. 1, the signal on the line 54b from the source Node B 16 to the UE 12 may be characterized as an acknowledgement signal from the source Node B 16 to the UE 12 and, as previously described above, may result directly in the start of the predefined timer 62 indicating when to begin to receive the transmission from the other Node B, i.e., the target Node B 26 in the other cell. The reception of the data flow from the target Node B 26 is shown by an HSDPA downlink interface on a line 14b in FIG. 1 where the indicated transmission is a HS-DSCH transmission to a UE reception window. Reception of the new frames in the new cell is shown occurring after the timer 62 has timed out. FIG. 1 shows the device of FIG. 2 34 receiving the data from the target Node B 26 and the reception of this data then continues as indicated by a reference numeral 70 in FIG. 1.

In the description which follows of the inventive configuration message, it should be noted that the delivery and timing of the configuration message is not necessarily distinct from the HS-DSCH transmission of user data on the line 14b but is rather shown that way as separate signals for the purposes of clarity. In like manner, the device 34 of FIG. 2 for receiving data from the RAN and the device 102 for receiving/sending reconfiguration information need not be distinct devices as shown but can be combined into a single device such as a signal processor. Referring back to FIG. 1, and the fact that it has to be understood that the signal on the line 14*b* does not necessarily only contain plain user data but may also carry any of the configuration messages on lines with the reference numeral 90, it will be realized that the RNC should send the reconfiguration signal information as fast as possible to the user equipment via the target cell or the Node Bs 24, i.e., immediately when the user equipment has started to listen to the target cell.

According to the present invention, a configuration message 20*b*, e.g., a physical channel reconfiguration message, is shown in FIG. 1 being prepared for transmission from the RNC 22 via the target Node B 26 to the UE 12. As indicated, the message can include an indication that the pre-defined configuration can be kept (dual information element) or a set of new information elements is provided for the new configuration as a normal release 5/6 reconfiguration procedure with the serving HS-DSCH cell change. An indication may be provided of a new or partly new configuration, which the radio access network prefers over the pre-configured configuration. It could for instance contain an indication of possible new neighboring cells which the user equipment may or shall consider for a subsequent switch in reception of a high-speed data flow. This configuration message is shown transmitted as a signal on a line 90*a* from the RNC 22 via the target Node B 26 to the UE 12. In FIG. 2 the RNC is shown having a device 100 for sending the configuration message on the line 90*a*1 to the target Node B 26 shown in FIG. 2 within the "Node Bs" 24. A signal processor 92 receives the configuration message on the line 90*a*1, processes it, and provides the processed configuration message on the HSDPA downlink 90*a*2 from the target Node B 26 to a device 102 for receiving configuration information within the UE 12. As mentioned, the message on the line 90*a* may contain an indication of a new or partly new configuration, which the radio access network prefers over the pre-configured configuration, which may indicate possible new neighboring cells which the user equipment may or shall consider for a subsequent switch in reception of said high-speed data flow. The device 102 processes the configuration message and sends a reconfiguration complete message on the line 90*b*1 to the signal processor 92 within the target Node B 26 which in turn forwards it on a hardwired line 90*b*2 to the device 100 within the RNC 22. The message on the lines 90*b*1, 90*b*2 may include an indication of a new or partly new configuration, which as mentioned the radio access network indicated it prefers over the pre-configured configuration, comprising possible new neighboring cells which the UE may consider for subsequent switch of the reception of a high-speed data flow. The device 100 is able to receive reconfiguration information either indicating that the configuration is complete using the configuration sent on the line 90*a*1 or that a new configuration has been selected by the UE and signaled on the line 90*b*2 back to the device 100 within the RNC 22.

Thus, when UTRAN receives the indication on the line 40 which may be a layer 3 (L3) message (L1/L2 indications are also possible) from the UE 12 that it wants to switch the HS-DSCH reception to the other cell in the active set (AS), the UTRAN sends a reconfiguration message on the line 90*a* (FIG. 1) via the Node B 26 in a target cell (or in case of bi-casting via both the target and source cells). The reconfiguration message can be either on a physical channel—transport channel—or radio bearer reconfiguration message or active set update message. This message can only contain a new indication that informs the UE to keep the configuration that is previously pre-configured for further use (for the source cell which UE is currently using) or include a completely new or partly new configuration, which UTRAN prefers in this situation over the pre-configured configuration and possible new neighboring cells which UE shall consider for subsequent switch of the reception of a high-speed data flow,. After receiving the configuration message the UE acts on the reconfiguration message as defined in Rel5/6 and responds with the normal reconfiguration complete message.

From the L3 point of view the mobility procedures are kept as they are currently but a new possibility to signal reconfiguration via a pre-configured cell is given.

It should be noted that the functional blocks shown in FIG. 2 can be carried out by software, firmware, hardware, or any combination thereof as will be appreciated by those of skill in the art. For instance, an integrated circuit can be provided that combines one or more of the functions shown for installation in either the user equipment, the radio network controller, the Node B or the like. As will also be appreciated by those of skill in the art, some or all of the functions not carried out in hardware can be carried out in software whereby instructions coded according to a selected programming language are written for execution on a signal processor which may include a central processing unit (CPU) that is able to execute such instructions which are retrieved from a memory device resident in the user equipment or network element. Inasmuch as the various functions and means for carrying out the functions have been described in a general way, it will be appreciated that these functions can be combined in any way as separable software and hardware elements which altogether carryout the claimed invention.

It has already been mentioned that the various devices shown in FIG. 2 may be carried out by means of software executed on a signal processor such as that of the signal processors 48, 32, 92 shown in the Node B 24 or within a single equivalent signal processor within the Node B 24. Such a signal processor 92 is shown in detail in FIG. 2 as comprising a number of components including a read only memory, a random access memory, a central processing unit, a clock, input/output device, and other devices all interconnected by data, address and control lines as will be appreciated by one of skill in the art for carrying out one or more of the methodological steps as needed to produce the signalling shown to or from any of the devices of FIG. 1. It will also be appreciated that the separate devices shown in the RNC 22 and the separate devices shown in the user equipment 12 may also be implemented in software carried out by a signal processor within the RNC 22 and/or the user equipment 12. Similarly, such signal processors may be carried out as integrated circuits instead of the general purpose signal processor shown in FIG. 2, in other words as dedicated signal processors.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

The invention claimed is:

1. Method for execution in a radio access network, comprising:
    receiving a signal indication from a user equipment indicating that the user equipment wants to switch reception of a high-speed data flow from a source cell to a target cell;
    switching transmission of said data flow to the user equipment from said source cell to said target cell;

sending to the user equipment a reconfiguration message via said target cell, said reconfiguration message containing an indicator that indicates that the user equipment keep a pre-configured configuration or change to a new or partly new configuration; and receiving from the user equipment a reconfiguration complete message.

2. The method of claim 1, wherein the indicator of a new or partly new configuration includes a new neighboring cell which the user equipment may consider for a subsequent switch in reception of said high-speed data flow.

3. The method of claim 1, further comprising waiting a predetermined period of time between said receiving said signal indication and said switching said transmission of said data flow.

4. The method of claim 1, further comprising sending said reconfiguration message via said source cell so that said reconfiguration message is bi-cast to said user equipment from both said source cell and said target cell.

5. The method of claim 1, further comprising sending said reconfiguration message to said user equipment and including a pre-configuration of a neighboring cell that said user equipment shall consider as a second target cell for a subsequent switch in reception of said high-speed data flow.

6. Radio access network comprising:
a first device for receiving a signal indication from a user equipment indicating that the user equipment wants to switch reception of a high-speed data flow from a source cell to a target cell; and
a switching device for switching transmission of said data flow to the user equipment from said source cell to said target cell; and
a second device for sending to the user equipment a reconfiguration message via said target cell, the reconfiguration message containing an indicator that indicates that the user equipment keep a pre-configured configuration or change to a new or partly new configuration, and for receiving, in response to said reconfiguration message, a reconfiguration complete message from the user equipment.

7. The radio access network of claim 6, wherein the indicator of a new or partly new configuration includes a new neighboring cell which the user equipment may consider for a subsequent switch in reception of said high-speed data flow.

8. The radio access network of claim 6, wherein the switching device is configured to wait a predetermined period of time between said receiving said signal indication and said switching said transmission of said data flow.

9. The radio access network of claim 6, wherein said second device is also for sending said reconfiguration message via said source cell so that said reconfiguration message is bi-cast to said user equipment from both said source cell and said target cell.

10. A tangible computer readable medium having instructions stored thereon, the instructions comprising:
instructions for receiving a signal indication from a user equipment indicating that the user equipment wants to switch reception of a high-speed data flow from a source cell to a target cell;
instructions for switching transmission of said data flow to the user equipment from said source cell to said target cell;
instructions for sending to the user equipment a reconfiguration message via said target cell, said reconfiguration message containing an indicator that indicates that the user equipment keep a pre-configured configuration or change to a new or partly new configuration; and
instructions for receiving from the user equipment a reconfiguration complete message.

11. Integrated circuit for installation in said radio access network of claim 6 embodying two or more of the elements thereof in any combination.

12. Radio access network, comprising:
means for receiving a signal indication from a user equipment indicating that the user equipment wants to switch reception of a high-speed data flow from a source cell to a target cell;
means responsive to said signal indication from said user equipment for switching transmission of said data flow to the user equipment from said source cell to said target cell; and
means for sending to the user equipment a reconfiguration message via said target cell, the reconfiguration message containing an indicator that indicates that the user equipment keep a pre-configured configuration or change to a new or partly new configuration; wherein said means for receiving is further for receiving, in response to said reconfiguration message, a reconfiguration complete message from the user equipment.

13. The radio access network of claim 12, further comprising: means for waiting a predetermined period of time between said receiving said signal indication from said user equipment and said switching said transmission of said data flow.

14. The radio access network of claim 12, wherein said means for sending to the user equipment said reconfiguration message is also for sending said reconfiguration message via said source cell so that said reconfiguration message is bi-cast to said user equipment from both said source cell and said target cell.

* * * * *